(12) United States Patent
Zhou et al.

(10) Patent No.: US 11,971,079 B2
(45) Date of Patent: Apr. 30, 2024

(54) DUAL DEFLECTION RING VIBRATION REDUCTION SYSTEM

(71) Applicant: GM GLOBAL TECHNOLOGY OPERATIONS LLC, Detroit, MI (US)

(72) Inventors: Sen Jiang Zhou, Troy, MI (US); John Miller, Howell, MI (US); Craig David Reynolds, Davisburg, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 88 days.

(21) Appl. No.: 17/811,631

(22) Filed: Jul. 11, 2022

(65) Prior Publication Data
US 2024/0011540 A1 Jan. 11, 2024

(51) Int. Cl.
*F16F 15/14* (2006.01)

(52) U.S. Cl.
CPC ...... *F16F 15/1414* (2013.01); *F16F 2222/08* (2013.01); *F16F 2232/02* (2013.01)

(58) Field of Classification Search
CPC .................................................... F16C 27/066
See application file for complete search history.

(56) References Cited

U.S. PATENT DOCUMENTS

| | | | | | |
|---|---|---|---|---|---|
| 4,229,055 | A | * | 10/1980 | Olschewski | F16C 27/066 384/536 |
| 5,044,784 | A | * | 9/1991 | Lisowsky | F16C 27/066 384/582 |
| 5,603,574 | A | * | 2/1997 | Ide | F16C 17/065 384/119 |
| 10,247,267 | B2 | * | 4/2019 | Putz | F16D 65/18 |
| 10,450,893 | B1 | * | 10/2019 | Polly | F16C 33/7816 |
| 2019/0383299 | A1 | * | 12/2019 | Lucchetta | F04D 29/059 |
| 2020/0200215 | A1 | * | 6/2020 | Lee | F16C 27/04 |
| 2021/0140486 | A1 | * | 5/2021 | Haines | F16C 25/04 |

FOREIGN PATENT DOCUMENTS

| | | | | |
|---|---|---|---|---|
| DE | 19932485 | A1 * | 1/2001 | ............. D04B 15/48 |
| DE | 102004034701 | A1 * | 2/2006 | ............. F16C 23/082 |
| DE | 102008056024 | A1 * | 5/2010 | ............. B62D 5/0409 |
| DE | 102017218481 | A1 * | 4/2019 | |
| WO | WO-03072969 | A2 * | 9/2003 | ............. F16C 27/04 |

OTHER PUBLICATIONS

U.S. Appl. No. 17/141,594, filed Jan. 5, 2021. Sound Attenuation Assembly, a Ring Configured to Attenuate Sound and a Method. Zhou et al.

* cited by examiner

*Primary Examiner* — Melanie Torres Williams
(74) *Attorney, Agent, or Firm* — Lorenz & Kopf LLP

(57) ABSTRACT

A dual deflection ring system includes a pair of components that rotate relative to one another about an axis of rotation. One or more deflection rings are disposed between the components. The deflection ring(s) include two sets of pockets configured to provide two levels of compressibility in-series between the components. The two sets of pockets project radially relative to the axis of rotation and are compressible between the components.

20 Claims, 9 Drawing Sheets

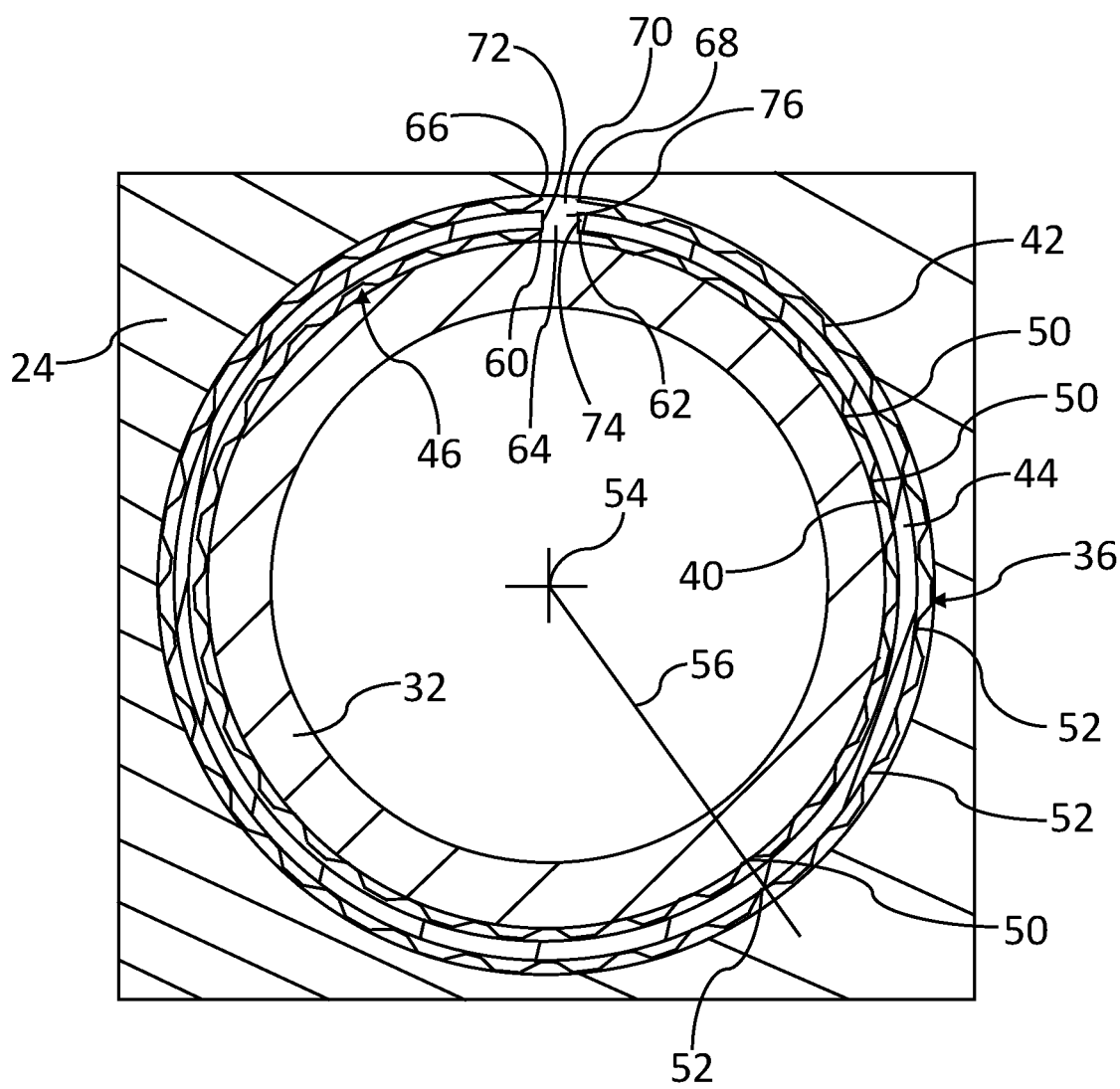
FIG. 3
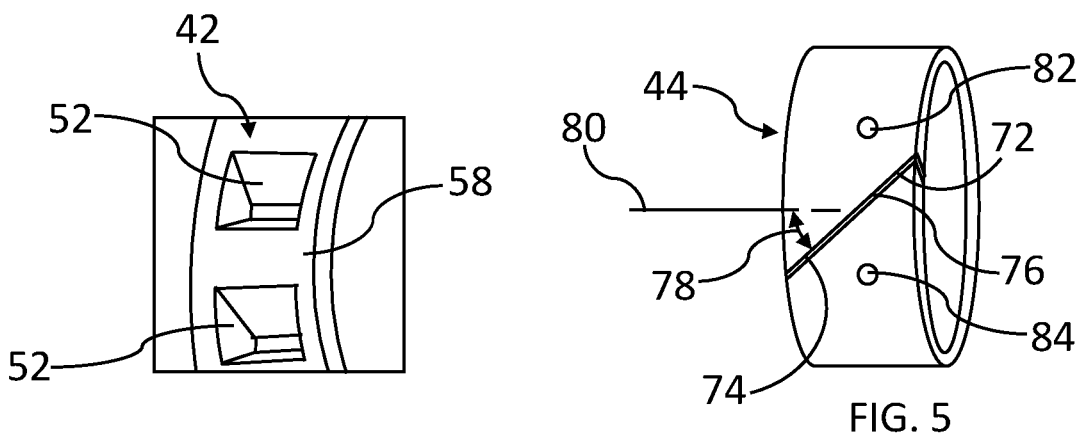
FIG. 4
FIG. 5

DUAL DEFLECTION RING VIBRATION REDUCTION SYSTEM

INTRODUCTION

The present disclosure relates to noise, vibration and harshness (NVH) in rotary machines and systems and more particularly, relates to NVH reduction through the use of deflectable rings disposed between two relatively rotating components such as a shaft and a case in a vehicle transmission.

In rotating systems one element such as a shaft, rotates relative to another element such as a housing. In some cases, both elements may rotate, such as where one shaft is disposed in a hollow shaft. Examples of rotating systems include mechanical transmissions, electrical motors, pumps, and other machines. In rotating systems, NVH may arise due to several factors. For example, meshing gears may be attached to a rotating shaft creating gear noise. In addition, shaft movement may occur during rotation, such as due to deflection, tolerance clearances and loading. The NVH that is created may be transmitted through components connected with or contacting the source components. The transfer to other components may result in amplification of the NVH.

Mitigating and minimizing NVH is desirable to increase the lifespan of rotating systems and to avoid undesirable perceptions by a human, such as an operator of the equipment. In the context of an automobile, such as passenger vehicles, occupants of a moving vehicle may experience NVH, at least to some degree. In some cases, NVH may become unpleasant at varying speeds and therefore, is desirably avoided. In some cases, NVH is mitigated by creating sound barriers to block the transfer to unwanted destinations. In other cases, minimization may be accomplished through exceedingly tight tolerances, which may be complex and difficult to maintain. It would be desirable to minimize NVH in rotating systems in an efficient and effective manner.

Furthermore, other desirable features and characteristics of the present disclosure will become apparent from the subsequent detailed description and the appended claims, taken in conjunction with the accompanying drawings and the foregoing technical field and background.

SUMMARY

In a number of embodiments, a dual deflection ring system includes a first component and a second component, where the components rotate relative to one another about an axis of rotation. At least on deflection ring is disposed between the components and includes two sets of pockets configured to provide two levels of compressibility in-series between the components. The two sets of pockets project radially relative to the axis of rotation and are compressible between the first component and the second component.

In an additional embodiment, the at least one deflection ring comprises an inner deflection ring and an outer deflection ring, wherein the outer deflection ring is disposed in a radially outward position relative to the inner deflection ring, wherein the first set of pockets is defined by the outer deflection ring and the second set of pockets is defined by the inner deflection ring.

In an additional embodiment, a reaction ring is disposed between the inner deflection ring and the outer deflection ring, wherein the reaction ring is substantially non-compressible.

In an additional embodiment, the reaction ring comprises at least one limiter that is shaped as a radial projection on the reaction ring configured to limit compression of the inner deflection ring and the outer deflection ring.

In an additional embodiment, the reaction ring is disposed in a radially outward position relative to the outer deflection ring.

In an additional embodiment, the reaction ring is disposed between the inner deflection ring and the outer deflection ring.

In an additional embodiment, the first component comprises a shaft and the second component comprises a case, and comprising a bearing disposed between the shaft and the case, wherein the at least one deflection ring is disposed between the bearing and the case.

In an additional embodiment, the at least one deflection ring comprises an inner deflection ring and an outer deflection ring, the outer deflection ring is disposed in a radially outward position relative to the inner deflection ring, the first set of pockets is defined by the outer deflection ring and the second set of pockets is defined by the inner deflection ring, the reaction ring is disposed in a radial position between the inner deflection ring and the outer deflection ring, and the reaction ring includes a series of discrete enlarged masses.

In an additional embodiment, the at least one deflection ring comprises an inner deflection ring and an outer deflection ring, the outer deflection ring is disposed in a radially outward position relative to the inner deflection ring, the first set of pockets is defined by the outer deflection ring and the second set of pockets is defined by the inner deflection ring, a first reaction ring is disposed in a radial position between the inner deflection ring and the outer deflection ring, and a second reaction ring is disposed in a radially outward position relative to the outer deflection ring.

In an additional embodiment, the at least one deflection ring comprises one deflection ring only, wherein the one deflection ring includes both the first set of pockets and the second set of pockets, the first set of pockets project in a radially inward direction, the second set of pockets project in a radially outward direction, and the first set of pockets is radially offset from the second set of pockets.

In a number of other embodiments, a first component and the second component rotate relative to one another about an axis of rotation. An inner deflection ring is disposed between the first component and the second component. An outer deflection ring includes a second set of pockets that project radially relative to the axis of rotation. The outer deflection ring is disposed between the inner deflection ring and the second component. The first set of pockets and the second set of pockets are compressible between the first component and the second component.

In an additional embodiment, the inner deflection ring includes a first set of pockets that project radially relative to the axis of rotation, wherein the first set of pockets comprises a first number of pockets and the second set of pockets comprises a second number of pockets, wherein the first number of pockets equals the second number of pockets.

In an additional embodiment, a reaction ring is disposed between the inner deflection ring and the outer deflection ring, wherein the reaction ring is substantially non-compressible.

In an additional embodiment, the reaction ring comprises a pair of limiters shaped as radially extending projections configured to limits compression of the inner deflection ring and the outer deflection ring.

In an additional embodiment, the reaction ring is disposed in a radially outward position relative to the outer deflection ring and against the second component.

In an additional embodiment, the reaction ring is disposed between the inner deflection ring and the outer deflection ring.

In an additional embodiment, the outer deflection ring is disposed in a radially outward position relative to the inner deflection ring, the reaction ring is disposed in a radial position between the inner deflection ring and the outer deflection ring, and the reaction ring includes a series of discrete enlarged masses.

In an additional embodiment, the outer deflection ring is disposed in a radially outward position relative to the inner deflection ring, a first reaction ring is disposed in a radial position between the inner deflection ring and the outer deflection ring, and a second reaction ring is disposed in a radially outward position relative to the outer deflection ring.

In an additional embodiment, the inner deflection ring does not include pockets and comprises a mass sufficient to reduce vibration transfer between the first and second components.

In a number of additional embodiments, a dual deflection ring system for a vehicle includes a transmission. The transmission includes a shaft, a case, and a bearing supporting the shaft on the case. The shaft is configured to rotate relative to the case about an axis of rotation. An inner deflection ring includes a first set of pockets that project radially relative to the axis of rotation, the inner deflection ring disposed in a radial position between the bearing and the case. An outer deflection ring includes a second set of pockets that project radially relative to the axis of rotation, the inner deflection ring disposed in a radial position between the inner deflection ring and the case. The first set of pockets and the second set of pockets are compressible between the first component and the second component.

DESCRIPTION OF THE DRAWINGS

The exemplary embodiments will hereinafter be described in conjunction with the following drawing figures, wherein like numerals denote like elements, and wherein:

FIG. 3 is a schematic, fragmentary, cross sectional illustration of select features of the transmission of FIG. 2, in accordance with various embodiments;

FIG. 4 is a fragmentary, perspective illustration of part of a deflection ring of the transmission of FIG. 1, in accordance with various embodiments;

FIG. 5 is a perspective illustration of a reaction ring of the transmission of FIG. 1, in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, a rotating system includes a dual deflection ring vibration reduction system. While references are made to vibration reduction, as used herein vibration is shorthand for NVH and so vibration may mean NVH may be equivalent to NVH. The dual deflection aspect may be accomplished by two deflectable rings or through one deflectable ring with dual deflection features for vibration isolation. In a number of embodiments, a reaction ring with optional mass features may be included for a second layer of vibration isolation. In additional embodiments, deflection limiters may be included to protect the deflectable rings from over-deflection. In specific embodiments, the dual deflection ring vibration reduction system may be disposed between a pair of components, such as a rotating shaft and a nonrotating case. In more specific embodiments, the dual deflection ring vibration reduction system may be disposed between the case and the outer race of a bearing that supports the rotating shaft on the case.

The dual deflection ring vibration reduction system provides two deflectable ring features in-series to achieve lower stiffness and may include features to avoid exceeding the ring load capacity. Lower stiffness aids in reducing NVH in the system, including through impedance mismatch, and allows for wider tolerance ranges and clearance, while the ring(s) perform in an elastic range. High load protection may be accomplished through the use of deflection limiters to ensure operation remains in the elastic range.

Figure 1:
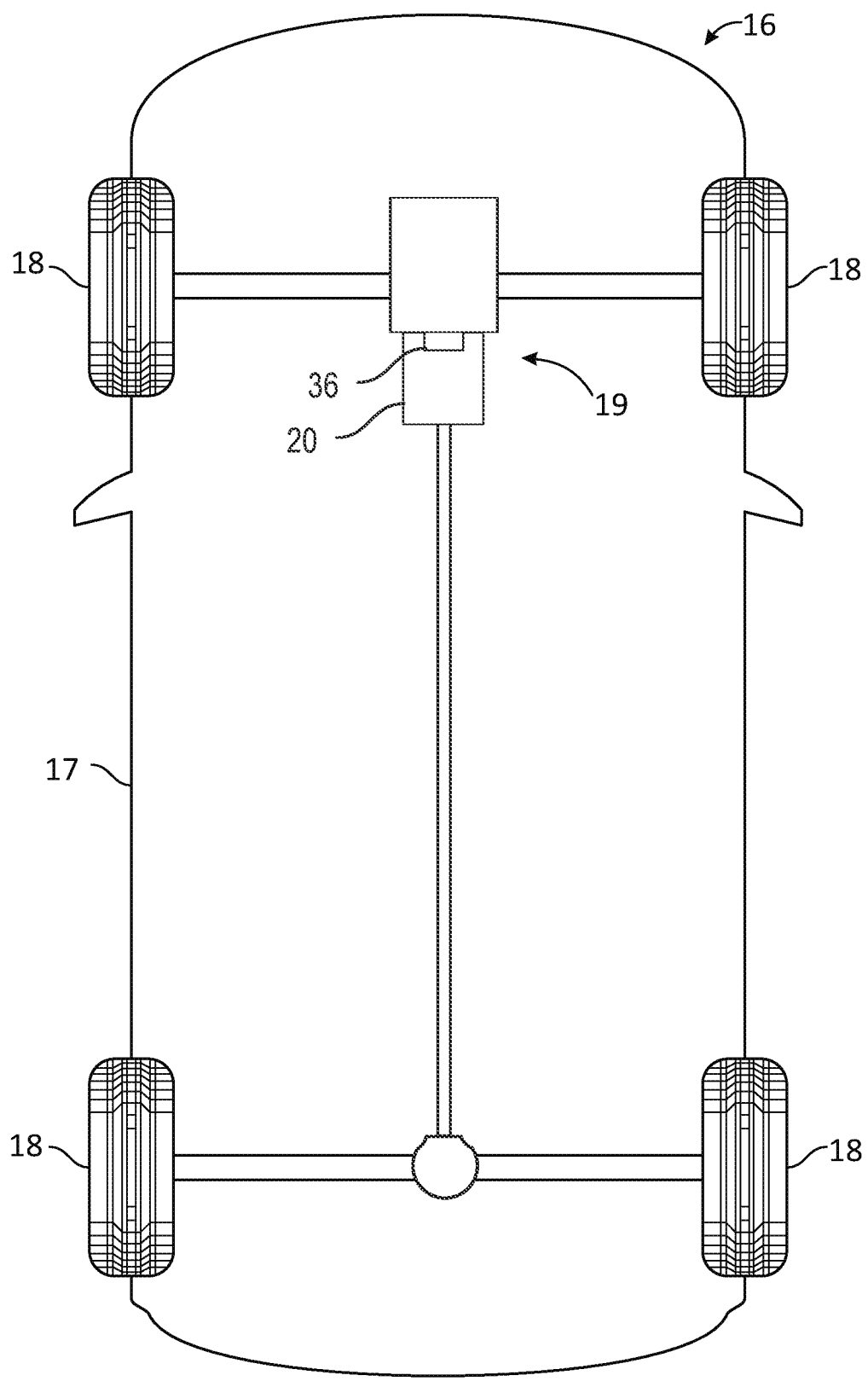
FIG. 1 is a schematic illustration of a vehicle with a propulsion system including a transmission, in accordance with various embodiments.

Referring to FIG. 1, in a number of embodiments, a dual deflection ring vibration reduction system 36 may be included in a vehicle 16. The vehicle 16 may be any one of a number of different types of land, sea, or air vehicles, and in certain embodiments, may for example, be a passenger automobile of any configuration. As depicted in FIG. 1, the vehicle 16 includes a body 17, wheels 18, and a propulsion system 19 that may include any combination of an engine and/or an electric motor. The propulsion system 19 may include a transmission 20. In various embodiments the vehicle 16 may differ from that depicted in FIG. 1. For example, in certain embodiments the number of wheels 18, the drive axles, and/or the style of the body 17 may vary. In the embodiment illustrated in FIG. 1, the propulsion system 19 supplies torque to drive the wheels 18 and is configured as a rotating system including the dual deflection ring vibration reduction system 36. The dual deflection ring vibration reduction system 36 may be included in any of multiple locations within the vehicle 16.

Figure 2:
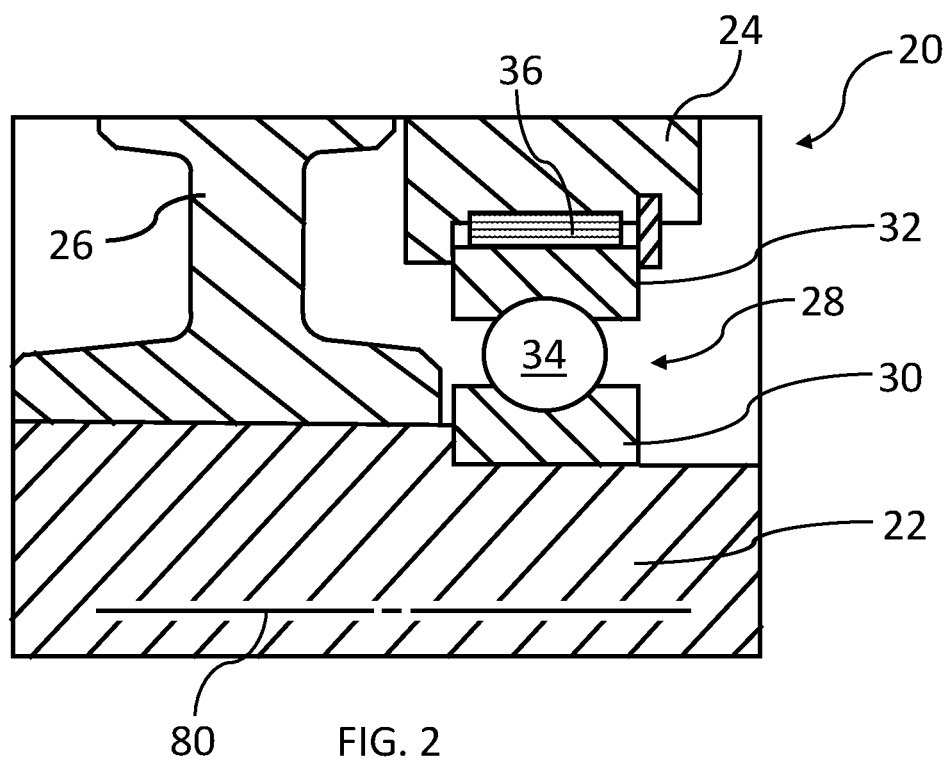
FIG. 2 is a schematic, fragmentary, cross sectional illustration of the transmission of FIG. 1, in accordance with various embodiments.

Referring to FIG. 2, an example application is illustrated in the form of a part of a transmission 20 with a number of components including a shaft 22 supported on a case 24. The shaft 22 rotates within the case and carries at least one gear 26 that may be a source of NVH. The transmission 20 includes a bearing 28 rotatably supporting the shaft 22 on the case 24. In this embodiment, the bearing 28 includes an inner race 30 engaging the shaft 22, an outer race 32 engageable with the case 24, and a number of balls 34 engaged between the inner race 30 and the outer race 32. The NVH transfer path through the transmission 20 is from the source at the gear 26, to the case 24 through the shaft 22, the inner race 30, the balls 34, the outer race 32 and an interposed dual deflection ring vibration reduction system 36. The dual deflection ring vibration reduction system 36 and its components encircle the outer race 32 and the shaft 22. The dual deflection ring vibration reduction system 36 is configured to interrupt the NVH path to reduce transfer to the case 24 and therefore, limit or avoid amplification, such as by the case 24. In other embodiments, the rotating system may be a device other than the transmission 20 and/or the support provided between the relatively rotation components may be another type of bearing or bearing surface. Including the dual deflection ring vibration reduction system 36 between the relatively rotating components adds benefits such as dampening and may create an impedance mis-match with a greater resistance to NVH transfer. Impedance as used herein is an indication of the extent to which a component or assembly resists the transmission of NVH.

In an embodiment shown in FIG. 3, the dual deflection ring vibration reduction system 36 is disposed between the outer race 32 and the case 24. The shaft 22 and the case 24 generically comprise relatively rotating components between which the dual deflection ring vibration reduction system 36 is disposed and are used as nonlimiting examples for purposes of this disclosure. The bearing 28 is disposed between the shaft 22 and the case 24. As illustrated in FIG. 3, the dual deflection ring vibration reduction system 36 includes three rings including an inner deflection ring 40, an outer deflection ring 42 and a reaction ring 44, all disposed in a clearance space 46. The clearance space 46 is an annular shaped opening provided in the case 24, and because the dual deflection ring vibration reduction system 36 includes deflection features, the tolerances and applicable clearances between the outer race 32 and the case 24 may be wider than otherwise possible. The inner deflection ring 40 encircles and is disposed adjacent or against the outer race 32 and the outer deflection ring 42 encircles the inner deflection ring 40 and is disposed adjacent or against the case 24. The reaction ring 44 is disposed between (in the radial direction), the inner deflection ring 40 and the outer deflection ring 42.

In this embodiment, the inner deflection ring 40 includes twenty-nine radially inwardly projecting pockets 50 and the outer deflection ring 42 include the twenty-nine radially inward projecting pockets 52. Radially inward means the pockets 50 and the pockets 52 are formed as cup-like depressions that extend inward toward the center 54 and toward the outer race 32 in a radial direction. While twenty-nine pockets 50, 52 are illustrated, the number will vary by application, however the same number will be included in both the inner deflection ring 40 and the outer deflection ring 42 in this embodiment. The pockets 50 are radially aligned with the pockets 52 meaning that each pocket 50 is centered on a common radial line, such as reference radial line 56 extending from the center 54, with a pocket 52 as illustrated, but in operation the positions may change. The reference radial line 56 extends in the radial direction. Referring additionally to FIG. 4, a perspective view of part of the outer deflection ring 42 shows that it includes a circular band-shaped body 58 with the pockets 52 formed therein. The pockets 50, 52 are formed features that may take a variety of shape to be tailored to exhibit a desirable amount of compressibility under the loads of the application within which they are used. Other than the shaped pockets 52, the outer deflection ring 42 is a thin band-like structure that is substantially circular.

Also shown in FIG. 3 is that the inner deflection ring 40 does not form a closed loop but has ends 60, 62 with a gap 64 between the ends 60, 62. Similarly, the outer deflection ring 42 includes ends 66, 68 with a gap 70 formed between the ends 66, 68. The reaction ring 44 is also not formed as a complete loop but is split with ends 72, 74 forming a gap 76. While the gaps 64, 70, 76 are shown radially aligned in FIG. 3, it will be understood that such would not necessarily be true in assembling the transmission 20 and they may independently migrate around the center 54 during operation of the transmission 20.

Referring to FIG. 5, a perspective illustration of the reaction ring 44 is shown. The reaction ring 44 is circular in shape with the gap 76 formed by the ends 72, 74. The gap 76 is formed at an angle 78 relative to the rotational centerline 80 so that it is skewed across the reaction ring 44 to avoid a step-like alignment with the gaps 64, 70. When standing alone prior to assembly into the transmission 20, the gap 76 may be closed with the ends 72, 74 touching each other. Accordingly, the reaction ring 44 includes holes 82, 84 for the inserting of a tool for expanding during assembly.

Figure 6:
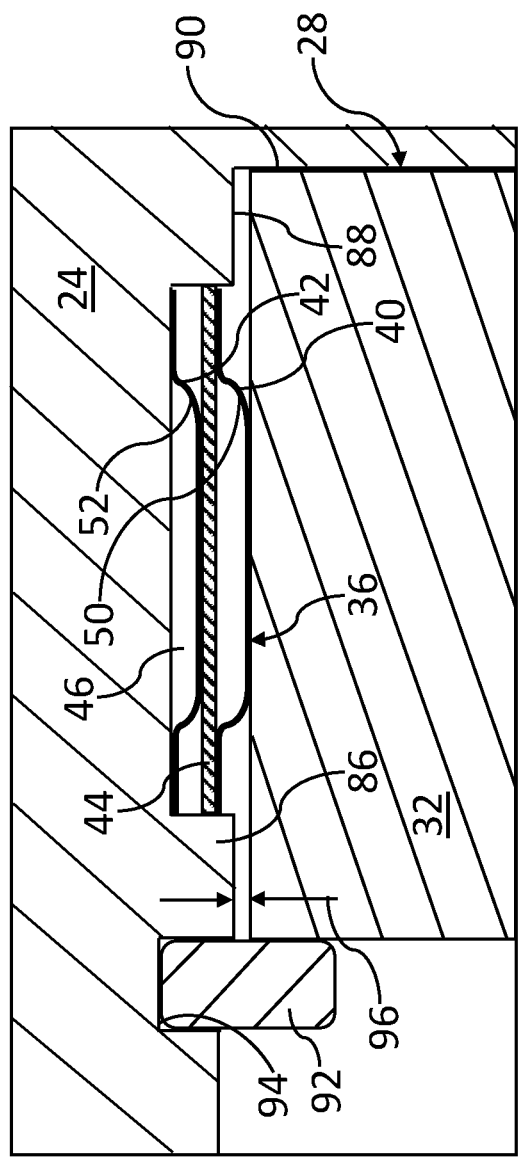
FIG. 6 is a schematic, fragmentary, cross sectional illustration of the dual deflection ring vibration reduction system area of the transmission of FIG. 1, in accordance with various embodiments.

Referring to FIG. 6, during assembly the outer deflection ring 42 is placed into the clearance space 46, which comprises a radially outward formed annular groove in the case 24 disposed between shoulders 86, 88. During insertion, the outer deflection ring 42 may be compressed to close the gap 70. The reaction ring 44 is then similarly inserted followed by the inner deflection ring 40. The bearing 28 with the outer race 32 is then inserted in an axial direction into the annular groove 90 so that the outer race 32 is disposed radially inward from both shoulders 86, 88. A split ring 92 is then inserted into a groove 94 to retain the bearing 28 in position which also retains the dual deflection ring vibration reduction system 36 in position. Later in assembly the shaft 22 may be inserted through the bearing 28.

In operation, NVH experienced by the bearing 28 is transferred to the dual deflection ring vibration reduction system 36. The pockets 50, 52 allow deflection of the inner deflection ring 40 and of the outer deflection ring 42 to attenuate the NVH. The reaction ring 44 provides a rigid structure for the inner and outer deflection rings 40, 42 to react against. In addition, the reaction ring may comprise added mass to provide a second layer of attenuation. As a result, the dual deflection ring vibration reduction system 36 modifies the NVH transfer path between the bearing 28 and the case 24. The transfer may be reduced through dampening and impedance modification mechanisms. Impedance modification means the dual deflection ring vibration reduction system 36 may be used to impart an impedance mis-match between the bearing 28 and the case 24. The dual deflection features, disposed in series, achieve lower stiffness without reducing the ring load capacity. Lower stiffness assists in reducing NVH in the system and provides a level of control for the case shoulder clearance while the rings perform in the elastic range. The elastic deformation of the inner deflection ring 40 and of the outer deflection ring 42 may be exercised through a distance 96 between the bearing 28 and the shoulders 86, 88 which allows the outer race 32 to move radially until contact in made. Once the outer race 32 contacts the shoulders 86, 88 further deformation of the inner deflection ring 40 and of the outer deflection ring 42 is prevented providing an over-compression protection mechanism to ensure the inner deflection ring 40 and the outer deflection ring 42 remain in their elastic state.

Figure 7:
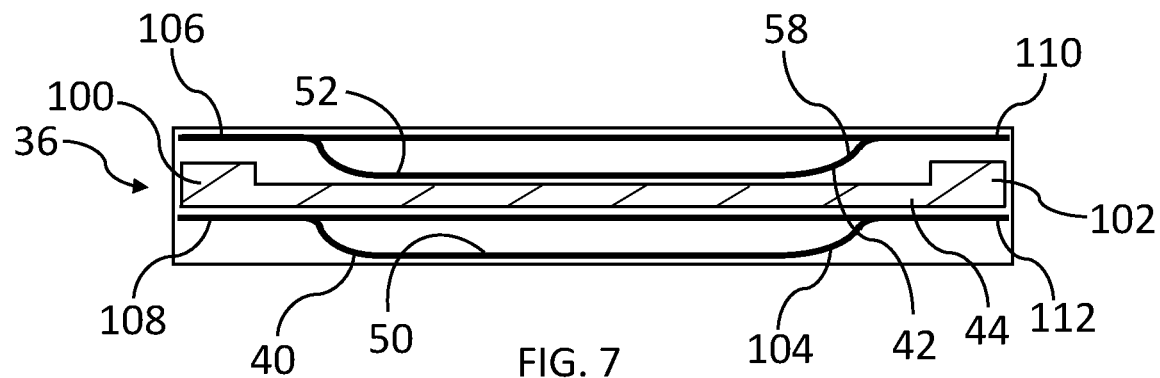
FIG. 7 is a schematic, fragmentary, cross sectional illustration of the dual deflection ring vibration reduction system of the transmission of FIG. 1 with limiters, in accordance with various embodiments.

Referring to FIG. 7, addition deformation limitation features are illustrated. The reaction ring 44 includes limiters 100, 102. The limiters 100, 102 limit deflection of the inner deflection ring 40 and of the outer deflection ring 42. The limiters 100, 102 may be employed in addition to the shoulders 86, 88, or as a replacement therefor. The deformation is accomplished by compliance of the pockets 50, 52. When the limiters 100, 102 become squeezed between the body 58 of the outer deflection ring 42 and the body 104 of the inner deflection ring 40, further deformation is resisted. In this embodiment, the reaction ring 44 includes two limiters 100, 102 disposed at opposite axial ends of the reaction ring 44 from one another. The limiters 100, 102 are formed as annular ring-like enlargements of the axial ends of the reaction ring 44. The limiter 100 is disposed radially between an annular rim 106 of the outer deflection ring 42 and an annular rim 108 of the inner deflection ring 40. The limiter 102 is disposed radially between an annular rim 110 of the outer deflection ring 42 and an annular rim 112 of the inner deflection ring 40.

Figure 8:
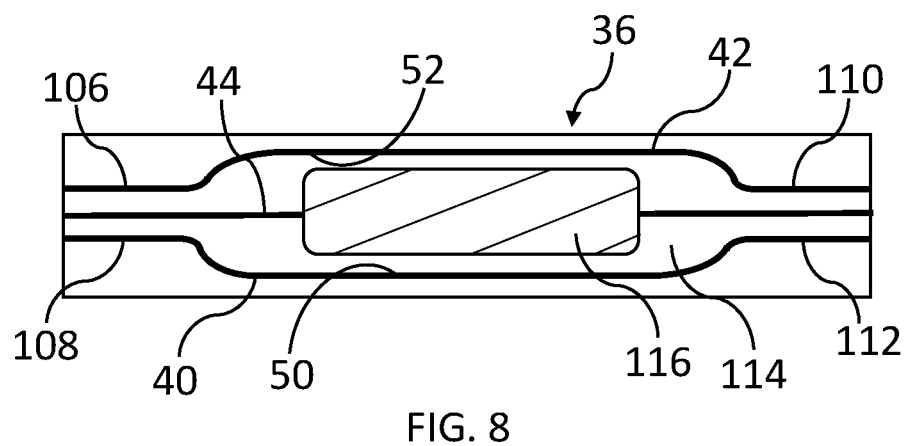
FIG. 8 is a schematic, fragmentary, cross sectional illustration of the dual deflection ring vibration reduction system of the transmission of FIG. 1 with tunable masses, in accordance with various embodiments.

Referring to FIG. 8, the inner deflection ring 40 is formed similarly to that of FIG. 3 with radially inward projecting pockets 50. The outer deflection ring 42 is formed with the pockets 52 formed as radially outward projecting features. The pockets 50, 52 comprise a common total number and each pocket 50 is radially aligned with a pocket 52. The result is that the rim 106 comes toward the rim 108 at the reaction ring 44 and the rim 110 comes toward the rim 112 at the reaction ring 44. This forms a series of cavities 114 within which the reaction ring 44 includes a series of discrete masses 116 that are enlarged and substantially thicker (in the radial direction) than the body of the reaction ring 44 outside the masses 116. The result is a relatively thin band-like structure of the reaction ring 44 with the masses 116 formed as capsule-like enlargements spaced from one another around the band-like shape. Each mass 116 is sized to fit in one cavity 114 and to limit deflection of the pockets 50, 52 to within their elastic range. The masses 116 are shown as solid structures but in other embodiments may be hollow with a level of compressibility themselves. The masses 116 may take a variety of shapes and may comprise a mass function that imparts an additional level of NVH attenuation to the dual deflection ring vibration reduction system 36 above that provided by compressibility of the inner deflection ring 40 and of the outer deflection ring 42.

The masses 116 may be tuned to provide an optimal level of attenuation. For example, generated vibrations may be analyzed, and resonant frequencies may be identified. The masses 116 may be configured with their own resonance characteristics so that the excitation frequencies of the transmission 20 are higher than the resonance frequency of the masses 116. The result is a higher level of attenuation in addition to that provided by the compressibility of the inner deflection ring 40 and of the outer deflection ring 42 and the impedance mismatch provided thereby.

Figure 9:
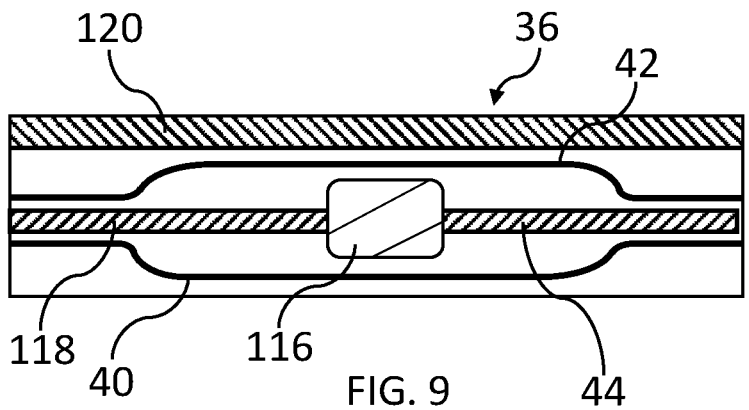
FIG. 9 is a schematic, fragmentary, cross sectional illustration of the dual deflection ring vibration reduction system of the transmission of FIG. 1 with a second reaction ring, in accordance with various embodiments.

Referring to FIG. 9, the dual deflection ring vibration reduction system 36 is configured similar to that of FIG. 8 but with some of the mass of the reaction ring 44 moved from the masses 116 to the body 118 of the reaction ring 44 itself with the band-like part formed of a thicker material. This configuration provides the benefit of greater tunability to address specific NVH sources. In addition, a second reaction ring 120 is included radially outside the outer deflection ring 42. The second reaction ring 120 provides added benefits such as reducing wear on the outer deflection ring 42 and improved functionality.

Figure 10:
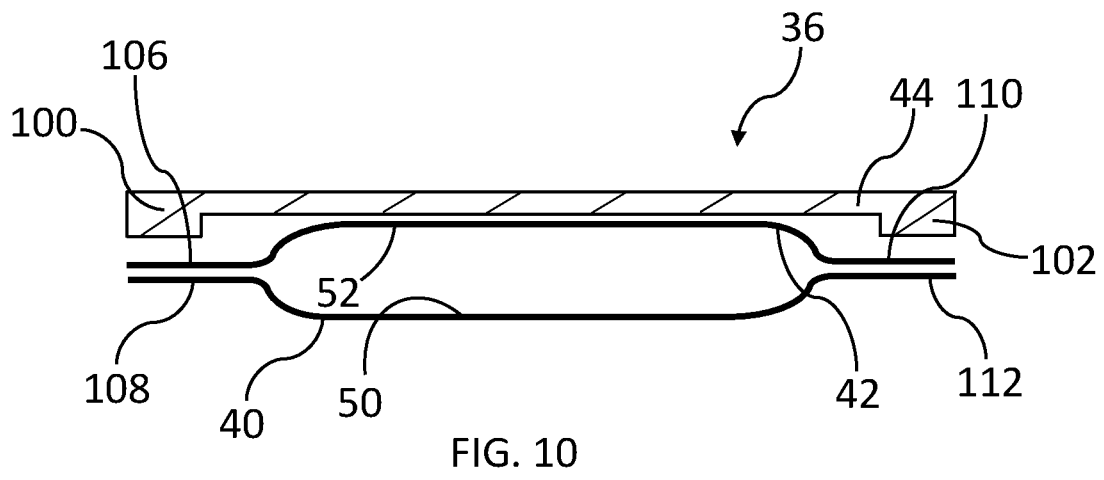
FIG. 10 is a schematic, fragmentary, cross sectional illustration of the dual deflection ring vibration reduction system of the transmission of FIG. 1 with an outer reaction ring, in accordance with various embodiments.
Figure 11:
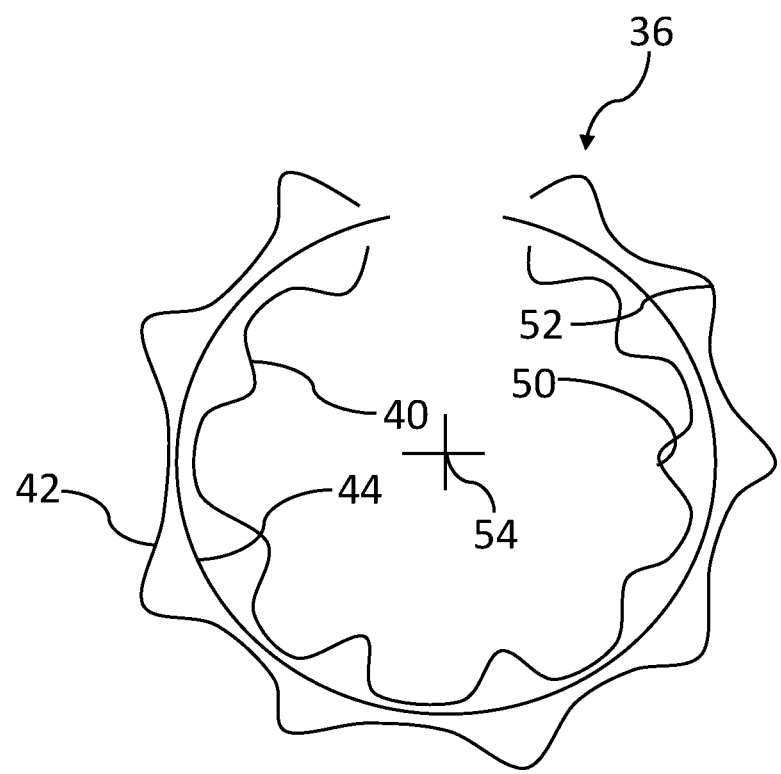
FIG. 11 is a schematic, fragmentary, axial cross sectional illustration of a dual deflection ring vibration reduction system, in accordance with various embodiments.

As shown in FIG. 10, the reaction ring 44 may be disposed outside of the deflection rings 40, 42 and radially outward from the outer deflection ring 42. The pockets 50, 52 project in opposite radial directions like those of FIG. 8. The rims 106, 108 touch each other as do the rims 110, 112. As in other embodiments, the pockets 50, 52 are deflectable and are disposed in-series, and in this embodiment the rim areas support each other. The reaction ring 44 is disposed radially outward from the outer deflection ring 42 and may reduce wear of the outer deflection ring 42 by providing a less aggressive contact area such as due to its ability to rotate, at least slightly, within the clearance space 46. The reaction ring 44 includes limiters 100, 102, which in this embodiment are formed as annular ring-like enlargements of the axial ends of the reaction ring 44 projecting radially inward to contact the outer deflection ring 42 at its rims 106, 110 to limit deformation. FIG. 11 illustrates an axial cross section of an embodiment showing the inner deflection ring 40, the reaction ring 44 and the outer deflection ring 42. The pockets 50 of the inner deflection ring 40 project in a radially inward direction and the pockets 52 of the outer deflection ring 42 project radially outward. The reaction ring 44 is formed of a relatively thin material and does not provide a significant mass addition. Accordingly, HVH attenuation is primarily provided by the inner deflection ring 40 and the outer deflection ring 42. Projecting the pockets 50 52 in opposite radial directions maximizes the amount of radial deformation available and therefore, in many applications the second layer of mass attenuation may not be needed.

Figure 12:
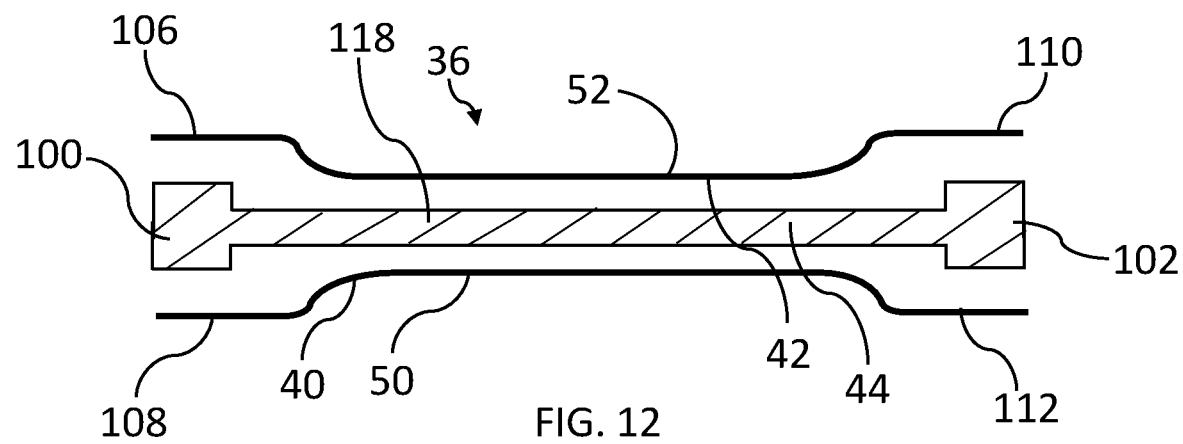
FIG. 12 is a schematic, fragmentary, cross sectional illustration of the dual deflection ring vibration reduction system of the transmission of FIG. 1 with an intermediate reaction ring with bi-directional limiters, in accordance with various embodiments.
Figure 13:
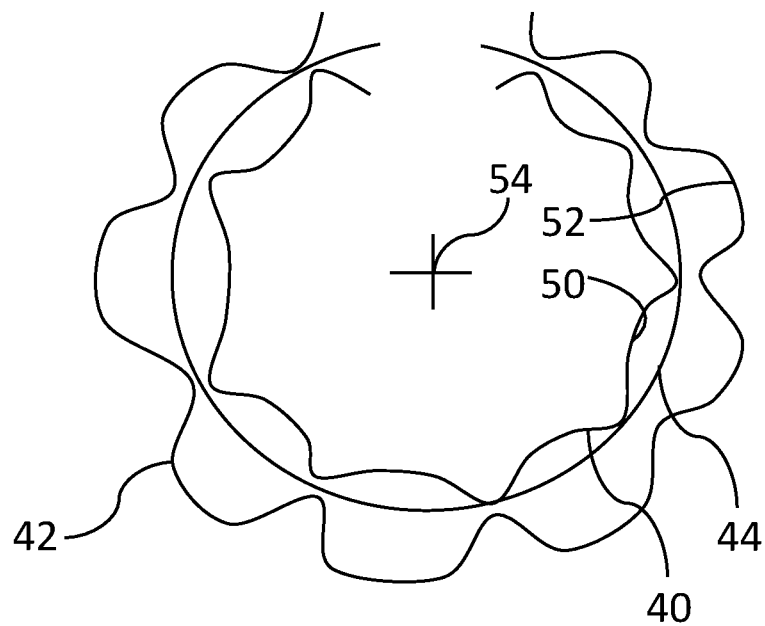
FIG. 13 is a schematic, fragmentary, axial cross sectional illustration of the dual deflection ring vibration reduction system FIG. 12, in accordance with various embodiments.

The cross section of the embodiment of FIG. 12 includes an inner deflection ring 40, an outer deflection ring 42, and a reaction ring 44 disposed between the inner deflection ring 40 and the outer deflection ring 42. The pockets 50 of the inner deflection ring 40 project radially outward and the pockets 52 of the outer deflection ring 42 project radially inward. As a result, the rims 106, 108 are separated from each other, and the rims 110, 112 are separated from each other. The reaction ring 44 includes limiters 100, 102 at its axial ends that are annular shaped and that project both radially inward and radially outward from the body 118 of the reaction ring 44. Providing limiters 100, 102 that project both radially inward and outward enables forming the pockets 50, 52 deeper as illustrated in FIG. 13. As illustrated, the number of the pockets 50 matches the number of the pockets 52 and each pocket 50 is radially aligned with a pocket 52. Forming the pockets 50, 52 deeper enables providing greater deflection and increased attenuation.

Figure 14:
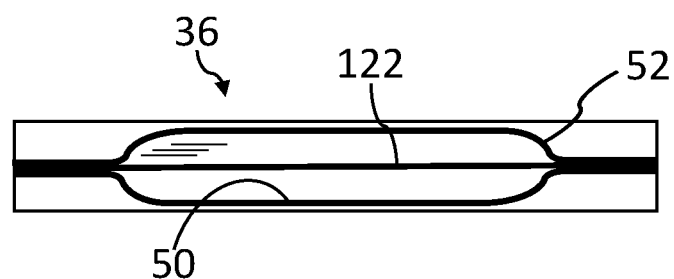
FIG. 14 is a schematic, fragmentary, cross sectional illustration of the dual deflection ring vibration reduction system of the transmission of FIG. 1 with one deflection ring, in accordance with various embodiments.
Figure 15:
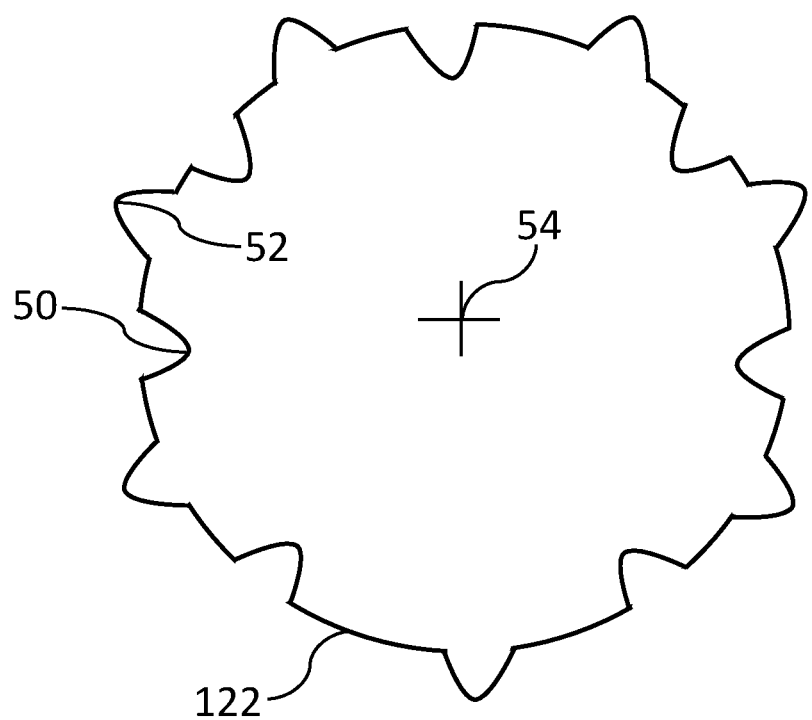
FIG. 15 is an axial cross sectional illustration of the dual deflection ring vibration reduction system FIG. 14, in accordance with various embodiments.

Referring to FIGS. 14 and 15, an embodiment enables omitting the reaction ring 44 and includes a single deflection ring 122. As shown in FIG. 14, the radially outward projecting pocket 52 is shown in the background of the section and the radially inward projecting pocket 50 is shown at the line of the section. As confirmed by FIG. 15, the radially outward projecting pockets 52 are staggered around the deflection ring 122 from the radially inward projecting pockets 50, and the pockets 50, 52 are radially offset from each other. Radially offset means that any pocket 50 does not fall on a common radial line with a pocket 52. Including both the radially outward projecting pockets 52 and the radially inward projecting pockets 50 on one deflection ring 122 provides the dual deflection ring vibration reduction system 36 in a simplified form. Alternating the inward and outward pockets 50, 52 eliminates the need for a reaction ring and is useful in light load applications, where less stiffness is preferred, or where deflection limitation may be provided by the shoulders 86, 88.

In embodiments, the inner deflection ring 40 and the outer deflection ring 42 may be made of a material amenable to forming in a ring-like shape with formed pockets such as stamped and formed steel, or another material with a spring rate adaptable to the application where the pockets 50 52 are elastically compressible. The reaction ring 44 may be made of a relatively dense material such as a steel or of a resilient material such as an elastomer, polymer, or composite material. In embodiments, the reaction ring 44 may be made of a substantially non-compressible material such as steel, another metal or another rigid material. Substantially non-compressible means the reaction ring 44 is made of a rigid base material structure such as steel and does not include features (e.g. pockets), to increase compressibility of the base material structure. When included the limiters 100, 102 may be made of a non-compressible material such as steel or another metal.

Accordingly, rotating systems include a dual deflection ring vibration reduction system. The dual deflection aspect may be accomplished by two deflectable rings or through one deflectable ring with dual deflection features for NVH isolation. In a number of embodiments, a reaction ring with optional mass may be included for a second layer of NVH isolation. Deflection limiters may be included to protect the deflectable rings from over-deflection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A dual deflection ring system comprising:
   a first component;
   a second component, wherein the first component and the second component rotate relative to one another about an axis of rotation;
   at least one deflection ring disposed between the first component and the second component, the at least one deflection ring including two sets of pockets including a first set of pockets and a second set of pockets, the two sets of pockets configured to provide two levels of compressibility in-series between the first component and the second component; and
   a reaction ring configured to contact the at least one deflection ring, wherein the reaction ring is substantially non-compressible,
   wherein the two sets of pockets project radially relative to the axis of rotation and are compressible between the first component and the second component.

2. The dual deflection ring system of claim 1, wherein the at least one deflection ring comprises an inner deflection ring and an outer deflection ring, wherein the outer deflection ring is disposed in a radially outward position relative to the inner deflection ring, wherein the first set of pockets is defined by the outer deflection ring and the second set of pockets is defined by the inner deflection ring.

3. The dual deflection ring system of claim 2, wherein the reaction ring is disposed between the inner deflection ring and the outer deflection ring.

4. The dual deflection ring system of claim 2, wherein the reaction ring comprises at least one limiter that is shaped as a radial projection on the reaction ring configured to limit compression of the inner deflection ring and the outer deflection ring.

5. The dual deflection ring system of claim 4, wherein the reaction ring is disposed in a radially outward position relative to the outer deflection ring.

6. The dual deflection system of claim 4, wherein the reaction ring is disposed between the inner deflection ring and the outer deflection ring.

7. The dual deflection system of claim 1, wherein the first component comprises a shaft and the second component comprises a case, and comprising a bearing disposed between the shaft and the case, wherein the at least one deflection ring is disposed between the bearing and the case.

8. The dual deflection system of claim 1, wherein:
   the at least one deflection ring comprises an inner deflection ring and an outer deflection ring,
   the outer deflection ring is disposed in a radially outward position relative to the inner deflection ring,
   the first set of pockets is defined by the outer deflection ring and the second set of pockets is defined by the inner deflection ring,
   the reaction ring is disposed in a radial position between the inner deflection ring and the outer deflection ring, and
   the reaction ring includes a series of discrete enlarged masses.

9. The dual deflection system of claim 1, wherein the reaction ring comprises a first reaction ring and comprising a second reaction ring, wherein:
   the at least one deflection ring comprises an inner deflection ring and an outer deflection ring,
   the outer deflection ring is disposed in a radially outward position relative to the inner deflection ring,
   the first set of pockets is defined by the outer deflection ring and the second set of pockets is defined by the inner deflection ring, the first reaction ring is disposed in a radial position between the inner deflection ring and the outer deflection ring, and the second reaction ring is disposed in a radially outward position relative to the outer deflection ring.

10. The dual deflection system of claim 1, wherein:

the first set of pockets project in a radially inward direction, the second set of pockets project in a radially outward direction, and the first set of pockets is radially offset from the second set of pockets.

11. A dual deflection ring system comprising:

a first component;

a second component, wherein the first component and the second component rotate relative to one another about an axis of rotation;

an inner deflection ring disposed between the first component and the second component, the inner deflection ring including a first set of pockets, the first set of pockets configured with a first compliance to allow deflection of the inner deflection ring; and an outer deflection ring including a second set of pockets that project radially relative to the axis of rotation, the second set of pockets configured with a second compliance to allow deflection of the outer deflection ring, the outer deflection ring disposed between the inner deflection ring and the second component, wherein the first set of pockets and the second set of pockets are compressible between the first component and the second component.

12. The dual deflection ring system of claim 11, wherein the first set of pockets project radially relative to the axis of rotation, wherein the first set of pockets comprises a first number of pockets and the second set of pockets comprises a second number of pockets, wherein the first number of pockets equals the second number of pockets.

13. The dual deflection ring system of claim 11, comprising a reaction ring disposed between the inner deflection ring and the outer deflection ring, wherein the reaction ring is substantially non-compressible.

14. The dual deflection ring system of claim 11, comprising a reaction ring, wherein the reaction ring comprises a pair of limiters shaped as radially extending projections configured to limit compression of the inner deflection ring and the outer deflection ring.

15. The dual deflection ring system of claim 14, wherein the reaction ring is disposed in a radially outward position relative to the outer deflection ring and against the second component.

16. The dual deflection system of claim 14, wherein the reaction ring is disposed between the inner deflection ring and the outer deflection ring.

17. The dual deflection system of claim 11, comprising a reaction ring, wherein:

the outer deflection ring is disposed in a radially outward position relative to the inner deflection ring, the reaction ring is disposed in a radial position between the inner deflection ring and the outer deflection ring, and the reaction ring includes a series of discrete enlarged masses.

18. The dual deflection system of claim 11, comprising a first reaction ring and a second reaction ring, wherein:

the outer deflection ring is disposed in a radially outward position relative to the inner deflection ring, the first reaction ring is disposed in a radial position between the inner deflection ring and the outer deflection ring, and the second reaction ring is disposed in a radially outward position relative to the outer deflection ring.

19. The dual deflection system of claim 11, comprising a mass sufficient to reduce vibration transfer between the first and second components.

20. A dual deflection ring system for a vehicle comprising:

a transmission in the vehicle, the transmission including a shaft and a case;

a bearing supporting the shaft on the case, wherein the shaft is configured to rotate relative to the case about an axis of rotation;

an inner deflection ring including a first set of pockets that project radially relative to the axis of rotation, the inner deflection ring disposed in a radial position between the bearing and the case;

an outer deflection ring including a second set of pockets that project radially relative to the axis of rotation, the inner deflection ring disposed in a radial position between the inner deflection ring and the case; and a reaction ring disposed between the inner deflection ring and the outer deflection ring, wherein the reaction ring is substantially non-compressible, wherein the first set of pockets and the second set of pockets are compressible between the first component and the second component.

* * * * *